United States Patent
Roman

[15] 3,659,804
[45] May 2, 1972

[54] WEB TAKE-UP DEVICE
[72] Inventor: Robert J. Roman, Rochester, N.Y.
[73] Assignee: Eastman Kodak Company, Rochester, N.Y.
[22] Filed: June 26, 1970
[21] Appl. No.: 50,274

[52] U.S. Cl. ............................................242/195, 352/72
[51] Int. Cl. ................G03b 1/04, G11b 15/32, G11b 23/04
[58] Field of Search ...................242/74, 74.1, 74.2, 195; 352/72–78, 157

[56] References Cited

UNITED STATES PATENTS

| | | | |
|---|---|---|---|
| 3,090,594 | 5/1963 | Doncaster et al. | 242/195 |
| 3,072,355 | 1/1963 | Faulkner et al. | 242/74.2 |
| 3,297,272 | 1/1967 | Dekker | 242/74.2 |

*Primary Examiner*—Leonard D. Christian
*Attorney*—Robert W. Hampton and G. Herman Childress

[57] ABSTRACT

An automatic web take-up device for apparatus, such as a motion picture projector, includes a film take-up reel with an arm attached to one flange of the film take-up reel. As film (or other web material) is fed to the device, the reel is rotated in a take-up direction and a hook-end portion of the arm engages the leading end portion of the film. The arm then guides the film end to a core portion of the reel as the reel continues to rotate. The film is released smoothly during rotation of the reel in an unwinding direction. The device may be completely self-contained, i.e., it can be added or removed from the associated apparatus as a unit.

9 Claims, 8 Drawing Figures

Patented May 2, 1972

ROBERT J. ROMAN
INVENTOR.

BY *D. Herman Childress*
*Robert W. Hampton*
ATTORNEYS

Patented May 2, 1972

ROBERT J. ROMAN
INVENTOR.

BY D. Herman Childress

Robert W. Hampton

ATTORNEYS

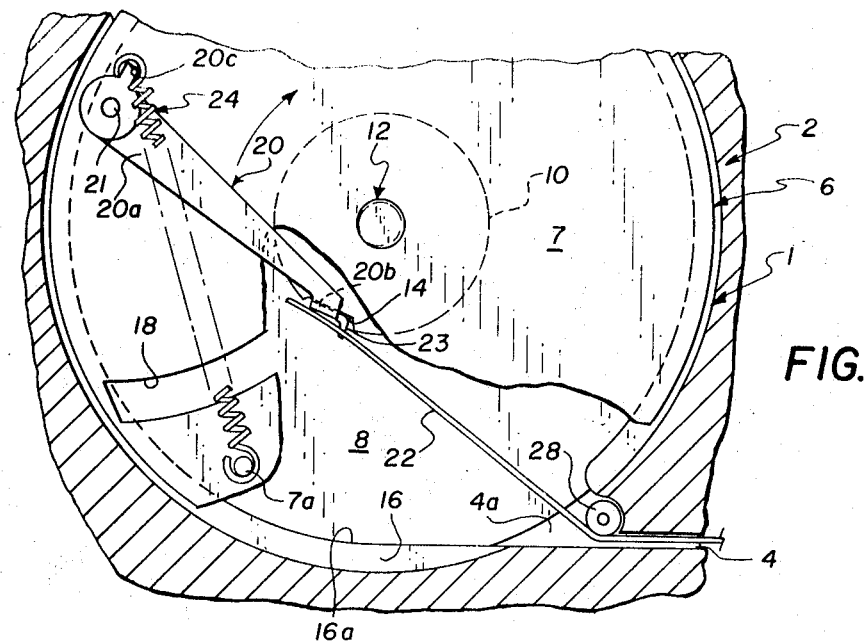
FIG. 6
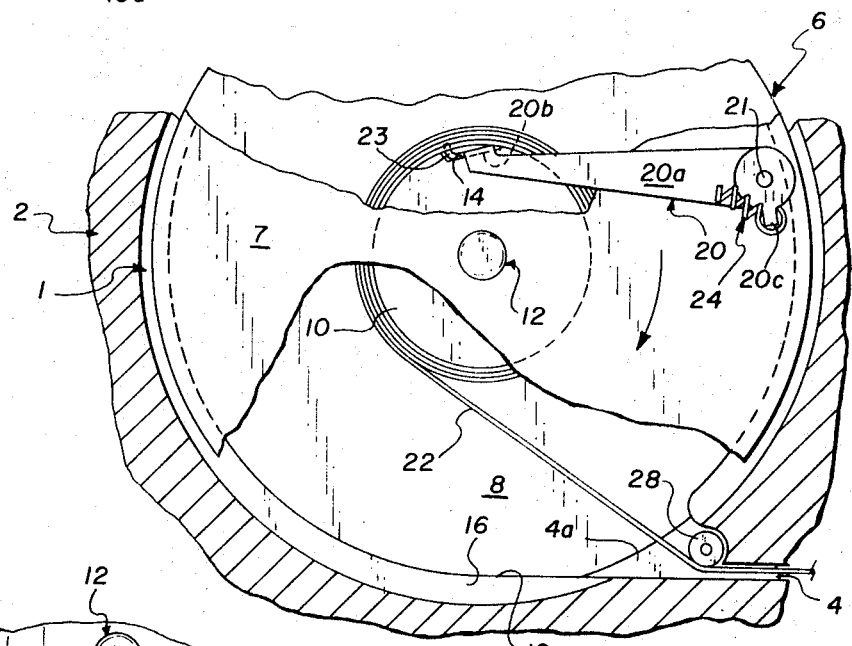
FIG. 7
FIG. 8
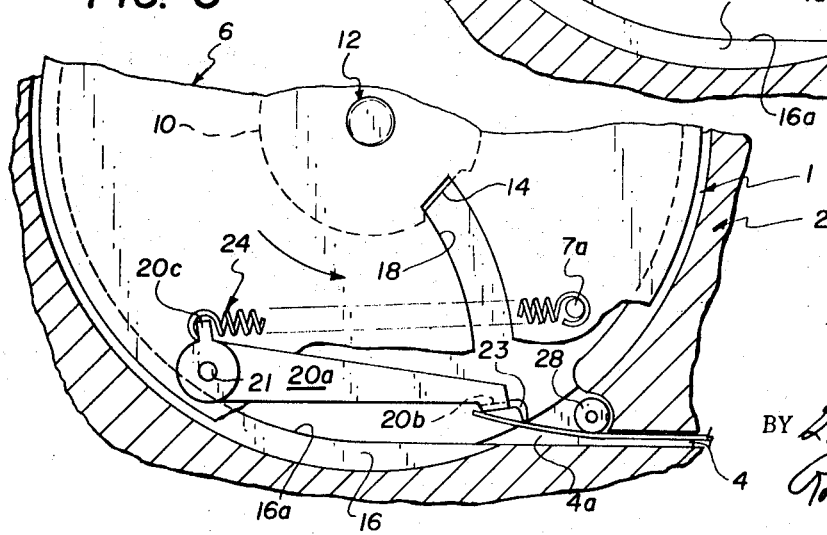
ROBERT J. ROMAN
INVENTOR.
ATTORNEYS 3,659,804

WEB TAKE-UP DEVICE

BACKGROUND OF THE INVENTION

1. Field of the Invention

The present invention relates to an automatic web take-up device that is adapted to operate with a web having a free end with perforations therein.

2. Description of the Prior Art

Generally present commercial web take-up devices are not equipped with web take-up mechanisms. In part, this is because such mechanisms are usually relatively complicated and/or relatively uneconomical. Also, they frequently are not self-contained units but require complex control mechanisms to be built into the machine with which they are to be used. Moreover, such mechanisms are not always highly reliable (as is required for use in a substantially enclosed take-up chamber). For example, accidental disengagement of the web from the take-up device may occur if the web is not held taut by the device. In addition, known devices may not be able to handle a web that is twisted or negatively curled.

SUMMARY OF THE INVENTION

Accordingly, it is an object of this invention to provide a web take-up device capable of automatically grasping the free end of a web or the like, guiding such web-end into the desired position on the device, and holding the web-end during winding of the web onto the device.

Another object of the invention is to provide an improved web take-up device that is highly reliable in operation and therefore suitable for use as a substantially fully enclosed web take-up device.

Another object of the invention is the prevention of accidental disengagement of the web from a web take-up device during operation by keeping the web taut.

A further object of the invention is to hold the web taut during the take-up part of a cycle of operation of a web take-up device, but disengage the web smoothly and without tearing or otherwise damaging the web during unwinding of web material from the device.

Still another object of the invention is to provide a web take-up device that can handle a twisted or negatively curled web with a high degree of reliability.

Another object of the invention is to provide an improved web take-up device that can be manufactured from only a few simple parts (and hence is economical to manufacture).

Another object of the invention is to provide a take-up reel assembly having web engaging mechanism as an integral part thereof, and wherein said engaging mechanism is capable of operating without external controls, i.e., it is operative in response to rotation of the reel.

Other objects and advantages of the invention will become apparent from the following disclosure of one preferred embodiment of the invention.

In accordance with the present invention, an automatic web take-up device for taking up a length of web having a free end with perforations therein comprises rotatably mounted means for receiving the free end of the web and for storing said web. The receiving means has a core on which the web is to be wound and at least one member projecting from the core. Web catcher means movably mounted on the member engages the free end of the web and guides the web onto the coil. Means coupled to the catcher means normally maintains the catcher means in a position for engaging the free end of the web as the web is delivered to the take-up device.

BRIEF DESCRIPTION OF THE DRAWINGS

In the detailed description of the preferred embodiment of the invention presented below, reference is made to the accompanying drawings, in which:

FIGS. 4–7 are views similar to FIG. 1 illustrating various positions of the parts during take-up operation of the device; and FIG. 8 is a view showing one position of the device during unwinding of web material from the device.

DESCRIPTION OF THE PREFERRED EMBODIMENT

Figure 1:
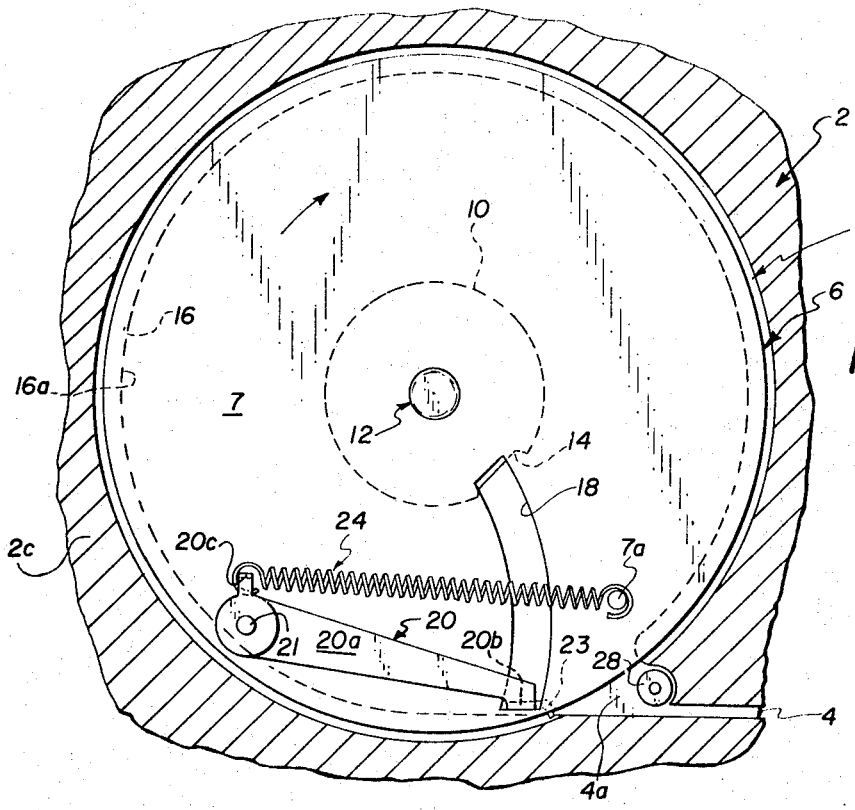
FIG. 1 is a front view of a web take-up device of this invention.

Because web handling apparatus are well known, the present description will be directed in particular to elements forming part of, or cooperating more directly with, the present invention, elements not specifically shown or described herein being understood to be selectable from those known in the art.

Referring to the drawings, a preferred embodiment of a film take-up device of the invention comprises a substantially enclosed take-up chamber 1 that is defined by appropriately contoured structure generally designated at 2. The structure 2 is illustrated as a base plate 2a (FIG. 3) a cover plate 2b, and an intermediate member 2c described more fully later. Structure 2 may comprise part of a motion picture projector, for example. A channel 4 in structure 2 provides a passageway through which film is fed to chamber 1. The channel has an enlarged throat portion 4a at the entrance to chamber 1.

Figure 2:
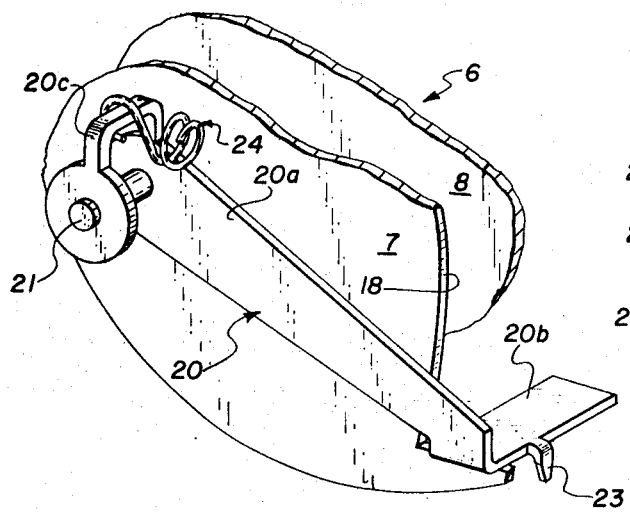
FIG. 2 is an isometric view of the web engaging means of the take-up device.
Figure 3:
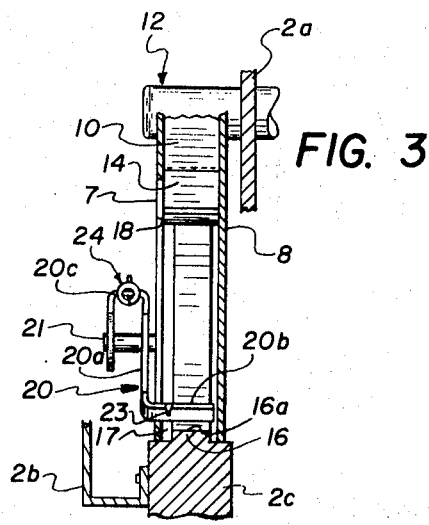
FIG. 3 is a section view of the web take-up device.

A film take-up reel generally designated 6 comprises two spaced circular flanges 7 and 8 which are connected to a generally cylindrical reel core 10. The core 10 is removably and rotatably supported by a spindle 12 that projects through plate 2a. The spindle is normally driven in a direction for rotating the reel in a take-up direction as indicated by the arrows in FIGS. 1 and 4–7. Preferably the spindle is driven through a friction drive at a speed that exceeds the rate at which film can be taken up on a reel 6. Core 10 has a flat, recessed portion 14 extending axially across its outer surface. Structure 2 has a guide rib 16 that projects slightly into the space between reel flanges 7 and 8 and defines a substantially annular, flat guide surface 16a. As shown in FIG. 3, rib 16 is narrower than the spacing between the reel flanges so that there is a narrow annular space 17 between rib 16 and flange 7. Flange 7 has an elongate, arcuate slot 18 that extends from adjacent the outer periphery of flange 7 to the recessed portion 14 of the reel core 10. axis of A film catching mechanism (best illustrated in FIG. 2) comprises a catcher arm 20 that is pivotably mounted at one end portion 20a to an outer side of flange 7 by pivot 21. The axis if pivot 21 is at the center of curvature of slot 18. The other end portion 20b of the arm is generally flat and projects substantially perpendicular to the arm portion 20a and extends through the slot 18 and into the space between the flanges 7 and 8. The projecting portion 20b has an integral depending hook 23 which projects substantially radially outwardly (with respect to reel core 10) and is positioned laterally on portion 20b so that it can be received by a perforation 22a (FIG. 4) in the side edge portion of the free or leading end of a strip of film 22 as it enters chamber 1 through the channel 4. Flat portion 20b is disposed with respect to the surface 16a so that when arm 20 engages the end of slot 18 remote from core 10 the portion 20b is closely adjacent surface 16a to flatten twisted or negatively curled film that may be fed to the take-up device. Also, the lateral position of hook 23 permits it to be received in the annular space 17 between rib 16 and reel flange 7.

The catching mechanism further comprises a coil tension spring 24 having end portions connected to a spring anchor portion 20c on arm 20 and to a pin 7a on the reel flange 7. The spring 24 exerts a resilient, biasing tension force on arm 20 tending to rotate the arm about pivot 21 in a clockwise direction (as viewed in the drawings) toward its rest or normal position as shown in FIGS. 1–4.

Figure 4:
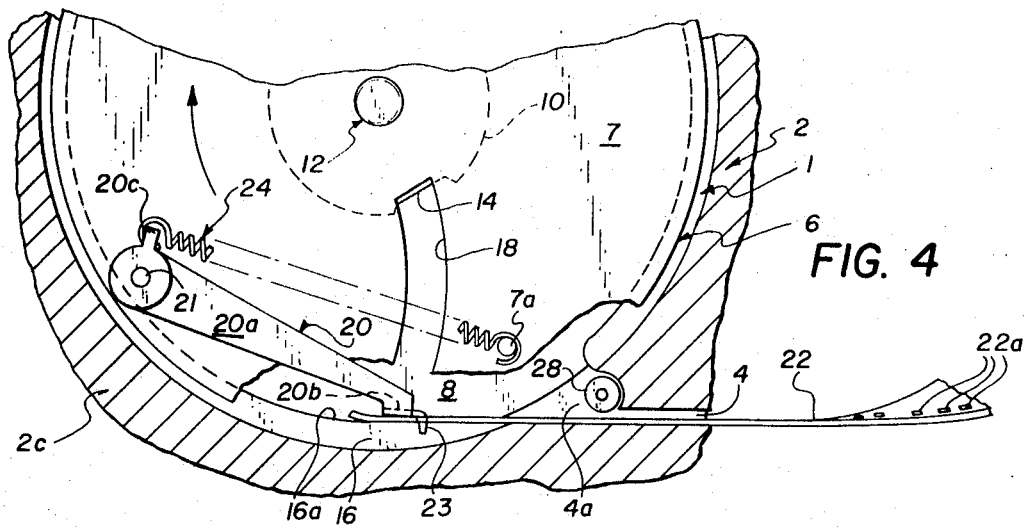
Figure 5:
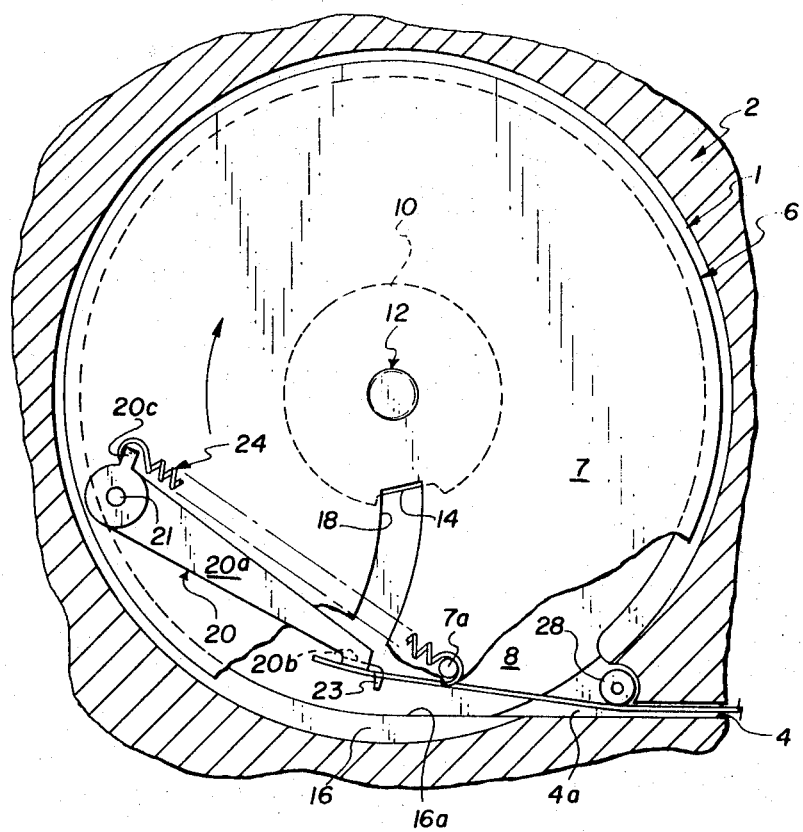

The operation of the invention will now be described with particular reference being made to FIGS. 1 and 4–8. Film 22 is fed (by means not shown) to the enclosed chamber 1 through channel 4 and through the entrance throat 4a. As this occurs, reel 6 and the attached catcher arm 20 are rotated clockwise by spindle 12. Arm 20 is held against the outer end of slot 18 by spring 24. When the film enters chamber 1 and arm 20 comes into position to engage the film, the film is first flattened against the flat surface 16a of the guide rib 16 by the arm portion 20b. This action assures proper handling of twisted or negatively curled film. At this time, hook 23 enters one of the film perforations as shown in FIG. 4.

When engagement of the film by the arm occurs, the arm 20 is free to rotate counterclockwise about pivot 21 against the bias of spring 24, thus absorbing much of the impact of the initial engagement between the arm and the film. This reduces the possibility of tearing or otherwise damaging the film. Also at this time the spring and the take-up reel inertia keeps the film taut, thus preventing accidental disengagement of the film from the arm. As the reel 6 continues to rotate, the catcher arm 20 rotates counterclockwise through its FIG. 5 position to its FIG. 6 position which is the maximum counterclockwise position of arm 20. As this occurs, the projecting portion 20b seats in the core recess 14 as shown in FIGS. 6 and 7. Hook 23 continues to hold the film, and further rotation of the reel results in winding up of convolutions of film on core 10 in the usual manner as shown in FIG. 7. A rotatable film guide roller 28 in throat 4a presents a smooth surface to the film as it enters the chamber, thus preventing scratching of the film.

During unwinding of film from a take-up device of this invention, reel 6 rotates in a counterclockwise direction (as viewed in the drawings) and this may result from pulling the film out of chamber 1 and through channel 4. As the last convolution of film is unwound from core 10 and the parts reach the position illustrated in FIG. 6, spring 24 begins moving arm 20 toward its FIG. 1 position so that the arm moves smoothly through its FIG. 5 position to its FIG. 4 position to bring the leading end portion of film 22 to the outer periphery of the film reel as shown in FIG. 4 where it is directly in line with channel 4. When the device reaches its FIG. 8 position the guide roller 28 presses downwardly on the film end portion to smoothly disengage it from hook 23 and prevent tearing to the film or other damage to the film. Momentum imparted to the reel through the arm by the film and engagement between the arm and the end of slot 18 tends to lift the hook slightly with respect to the direction of the film travel through the channel 4 at the time disengagement occurs, thereby facilitating disengagement of film from the arm.

The automatic take-up device of this invention functions in a completely automatic manner and has a high degree of reliability, thereby permitting its use in fully enclosed take-up systems which are desirable in motion picture apparatus. In this regard, it is noted that if the hook fails to engage the film during the first pass of the hook past throat 4a after film enters the chamber 1, the film will be engaged during the next or subsequent passes of the hook past the throat. In addition, the force exerted by the spring 24 and the geometry of the various parts of the device assures that the web will be maintained taut after it is initially grasped by the arm, and this avoids accidental disengagement of the web. At the same time, it will be seen that during unwinding of the web material from the device the web is smoothly and quickly separated from the arm so that no damage occurs to the web.

The take-up device of this invention can be manufactured from very few parts and requires only minor modifications of a conventional take-up reel, thus making it quite economical to manufacture. Because the arm is mounted on the reel, the device is substantially self-contained so that it can be furnished as accessory equipment for use on apparatus that would not otherwise have an automatic take-up device. The structure of the invention also eliminates the need for arms or control devices that normally are mounted on the housing of a projector or the like adjacent to the take-up reel. While the invention has been described in connection with motion picture projector apparatus, it will be understood that the invention is equally applicable to other apparatus for handling film, such as microfilm readers, cameras, etc., and for apparatus for handling other types of webs, such as magnetic tape or the like.

The invention has been described in detail with particular reference to a preferred embodiment thereof, but it will be understood that variations and modifications can be effected within the spirit and scope of the invention.

I claim:

1. An automatic web take-up device for a length of a web having a free end, said device comprising:
   a. web receiving means for storing the web, the web receiving means having a core and at least one member projecting from said core;
   b. means coupled to said web receiving means for rotatably supporting said receiving means;
   c. web catching means rotatably mounted on said member and having a hooked portion for movement therewith between a first position for engaging the free end of the web and a second position for guiding the free end onto said core in response to rotation of said receiving means; and means for normally biasing said hooked portion of said catching means toward its first position for engaging the free end of the web as the web is delivered to the take-up device.

2. An automatic web take-up device for a length of web having a free end, said device comprising;
   a. web receiving means for storing said web, the web receiving means having a core and at least one member projecting from said core;
   b. means coupled to said web receiving means for rotatably supporting said receiving means; and
   c. web catching means rotatably mounted on said member for engaging the free end of said web and for guiding the latter onto said core in response to rotation of said receiving means, said web catching means comprises (1) a catcher arm having a hooked portion for engaging the free end of the web, and (2) biasing means engaging said arm for urging said arm to a position for engaging the free end of the web as the web is delivered to the take-up device.

3. An automatic web take-up device for a length of web having a free end, said device comprising:
   a. web receiving means for storing the web, the web receiving means having a core and at least one substantially circular flange projecting from said core, said flange having an arcuate slot therein extending from a position substantially adjacent the outer circumference of said flange to a position substantially adjacent said core;
   b. means coupled to said web receiving means for rotatably supporting said receiving means; and
   c. web catching means rotatably mounted on said flange for engaging the free end of the web and for guiding the latter onto said core in response to rotation of said receiving means, said web catching means having (1) a portion which extends through said slot whereby the length of said slot determines the extent of movement of said catching means and (2) means for normally biasing said catching means to a position for engaging the free end of the web as the web is delivered to the take-up device.

4. An automatic web take-up device as claimed in claim 1 further comprising means engageable by the web during unwinding of the web from the device for smoothly disengaging the web from said web catching means.

5. In a motion picture projector including an automatic take-up device for film having a free end that is adapted to be fed by the projector toward the take-up device, the film having perforations therein, the improvement comprising:
   a. means defining a film take-up chamber in the projector, said means having a channel through which film can enter said chamber;
   b. a film take-up reel located within said chamber and positioned to receive film entering said chamber, said take-up reel comprising
      1. a generally cylindrical core rotatable about an axis, and 2. first and second reel flanges having outer circumferences, said flanges being attached to said core and being spaced from each other so that film can be wound on said core between said flanges, and said first flange having means defining a slot extending from a position substantially adjacent the outer circumference of said first flange to a position substantially adjacent said core;

c. means within said chamber coupled to said core for rotatably supporting said take-up reel for rotation about said axis; and d. means for engaging the free end of said film, comprising
   1. a film catcher arm rotatably mounted to the outer side of said first flange, said arm having a portion extending through said slot and having an elongated portion positioned between said flanges, said elongated portion having a hook portion positioned between said flanges for entering a perforation in the film for engaging film fed to said chamber between said flanges, and
   2. biasing means anchored to said catcher arm and to said first flange for urging said catcher arm to a position for engaging said film.

6. An automatic film take-up device as claimed in claim 5 wherein said core has a recess substantially adjacent and aligned with said slot, said recess being adapted to receive said elongated portion of said arm.

7. An automatic film take-up device as claimed in claim 5 wherein said elongated portion of the arm and a portion of said means defining said take-up chamber are positioned with respect to each other when the elongated portion is in its position for engaging film so that they are closely adjacent to each other during the engaging of the film by said film engaging means whereby twisted or negatively curled film can be handled by the device.

8. An automatic film take-up device as claimed in claim 5 wherein said means defining a chamber comprises plate members positioned with respect to each other to define a substantially enclosed chamber, said plate members having a channel therein through which film enters said enclosed chamber.

9. An automatic film take-up device as claimed in claim 5 wherein said chamber defining means defines an enlarged throat in said channel at the entrance of the channel into the chamber, and the device further comprises a roller located in said throat and engageable by film during unwinding of film from the reel, said roller being positioned to smoothly disengage film from said engaging means as the engaging means reaches a position adjacent the roller.

* * * * *